US011005822B2

(12) United States Patent
Barton et al.

(10) Patent No.: US 11,005,822 B2
(45) Date of Patent: May 11, 2021

(54) SECURING SUBSTATION COMMUNICATIONS USING SECURITY GROUPS BASED ON SUBSTATION CONFIGURATIONS

(71) Applicant: Cisco Technology, inc., San Jose, CA (US)

(72) Inventors: Robert Edgar Barton, Richmond (CA); Maik Guenter Seewald, Nuremberg (DE); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 16/402,568

(22) Filed: May 3, 2019

(65) Prior Publication Data

US 2020/0351249 A1 Nov. 5, 2020

(51) Int. Cl.
*H04L 29/06* (2006.01)

(52) U.S. Cl.
CPC ............ *H04L 63/04* (2013.01); *H04L 63/02* (2013.01); *H04L 63/101* (2013.01); *H04L 63/20* (2013.01)

(58) Field of Classification Search
CPC ....... H04L 63/04; H04L 63/20; H04L 63/101; H04L 63/02
See application file for complete search history.

(56) References Cited

U.S. PATENT DOCUMENTS 8,281,377 B1 * 10/2012 Snow .................... H04L 63/08
726/7
8,479,266 B1 * 7/2013 Delker ................ H04L 63/0272
726/4

(Continued)

FOREIGN PATENT DOCUMENTS

CN 106253487 12/2016
CN 107153946 9/2017

OTHER PUBLICATIONS

Lara er al., "OpenSec: Policy-Based Security Using Software-Defined Networking", IEEE Transactions on Network and Service Management, vol. 13, Issue: 1, Mar. 2016.*
Tan, et al., "Survey of Security Advances in Smart Grid: A Data Driven Approach", IEEE Communications Surveys & Tutorials, vol. 19, No. 1, pp. 397-422, 2017, IEEE.

(Continued)

*Primary Examiner* — Morshed Mehedi
(74) *Attorney, Agent, or Firm* — Behmke Innovation Group LLC; James M. Behmke; Jonathon P. Western

(57) ABSTRACT

In one embodiment, a network policy engine obtains a substation configuration description for a substation, indicative of intelligent electronic devices (IEDs), associated network communication devices, and related communication configuration information. The network policy engine then creates a mapping of the IEDs and the associated network communication devices based on the substation configuration description, associating each of the IEDs to a corresponding network port of the associated network commu- (Continued)

nication devices. The network policy engine may then further create network control parameters based on the substation configuration description, which comprise defined communication flows for the IEDs and associated security group tags (SGTs) for the defined communication flows. The techniques herein may then cause the SGTs to be imposed at mapped network ports of the network communication devices for the IEDs according to security group access (SGA)-based network control to thereby establish secure network communication for the IEDs within the particular substation.

20 Claims, 5 Drawing Sheets

(56) References Cited

U.S. PATENT DOCUMENTS

| | | | | |
|---|---|---|---|---|
| 8,893,216 | B2* | 11/2014 | Yadav | H04L 63/0236 726/1 |
| 2004/0117624 | A1* | 6/2004 | Brandt | H04L 69/329 713/166 |
| 2004/0148513 | A1* | 7/2004 | Scott | G05B 19/042 726/26 |
| 2014/0164595 | A1* | 6/2014 | Bray | H04L 63/02 709/224 |
| 2016/0344635 | A1* | 11/2016 | Lee | H04L 47/20 |
| 2017/0295205 | A1* | 10/2017 | Kwon | H04L 41/0816 |
| 2018/0234459 | A1* | 8/2018 | Kung | H04L 63/0263 |

OTHER PUBLICATIONS

Qureshi, et al., "A Survey of Communication Network Paradigms for Substation Automation", 2008 IEEE International Symposium on Power Line Communications and Its Applications, pp. 310-315, 2008, IEEE.

Sidhu, et al., "Modelling and Simulation for Performance Evaluation of IEC61850-Based Substation Communication Systems", IEEE Transactions on Power Delivery, vol. 22, No. 3, pp. 1482-1489, Jul. 2007, IEEE.

Ali, et al., "Comparisons process-to-bay level peer-to-peer network delay in IEC 61850 substation communication systems", Journal of Electrical Systems and Information Technology, vol. 1, Issue 3, Dec. 2014, pp. 266-275, Electronics Research Institute (ERI).

Adamiak, et al., "Security Aspects of Communications to Substations", https://www.gegridsolutions.com/smartgrid/May08/5_Security_Aspects_Communications.pdf, pp. 41-46, May 2008, General Electric.

Seewald, Maik, "A Behavior-Based Method for Threat Detection and Prevention in Energy Automation Systems", An IP.com Prior Art Database Technical Disclosure, Jun. 6, 2016, 5 pages.

* cited by examiner

SECURING SUBSTATION COMMUNICATIONS USING SECURITY GROUPS BASED ON SUBSTATION CONFIGURATIONS

TECHNICAL FIELD

The present disclosure relates generally to electric grids and communication networks, and, more particularly, to securing substation communications using security groups based on substation configurations.

BACKGROUND

Electric power is generally transmitted from generation plants to end users (residential, commercial, and industrial (C&I), etc.) via a transmission and distribution grid consisting of a network of power stations, transmission circuits, and substations interconnected by powerlines. Once at the end users, electricity can be used as energy to power any number of devices.

The Common Information Model (CIM) is an International Electrotechnical Commission (IEC) standard which facilitates and simplifies information exchange (such as configuration, topology, status of an electrical network, etc.) amongst various applications. The standard utilizes a Unified Modeling Language (UML) model to define a common vocabulary and basic ontology for aspects of the electric power industry. The central package within the CIM is the "wires model" which describes the basic components used to transport electricity.

CIM can be used to derive "design artifacts" as needed for the integration of related application software (e.g., Extensible Markup Language (XML) Schema, Resource Description Framework (RDF) Schema). Various additional standards may be used with CIM to provide energy management systems, outage management systems, supervisory control and data acquisition (SCADA), planning, and optimization. In addition, other models (standards) may be used for grid visualization, planning, operations, and simulations.

Similarly, the Substation Configuration Description Language (SCL) is a language and representation format used for the configuration of electrical substation devices, such as for representation of modeled data and communication services.

Notably, however, CIM and SCL provide only limited communication architecture support. Moreover, existing tools, primarily for visualization, do not support any computer (Internet Protocol) network configuration or provisioning.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
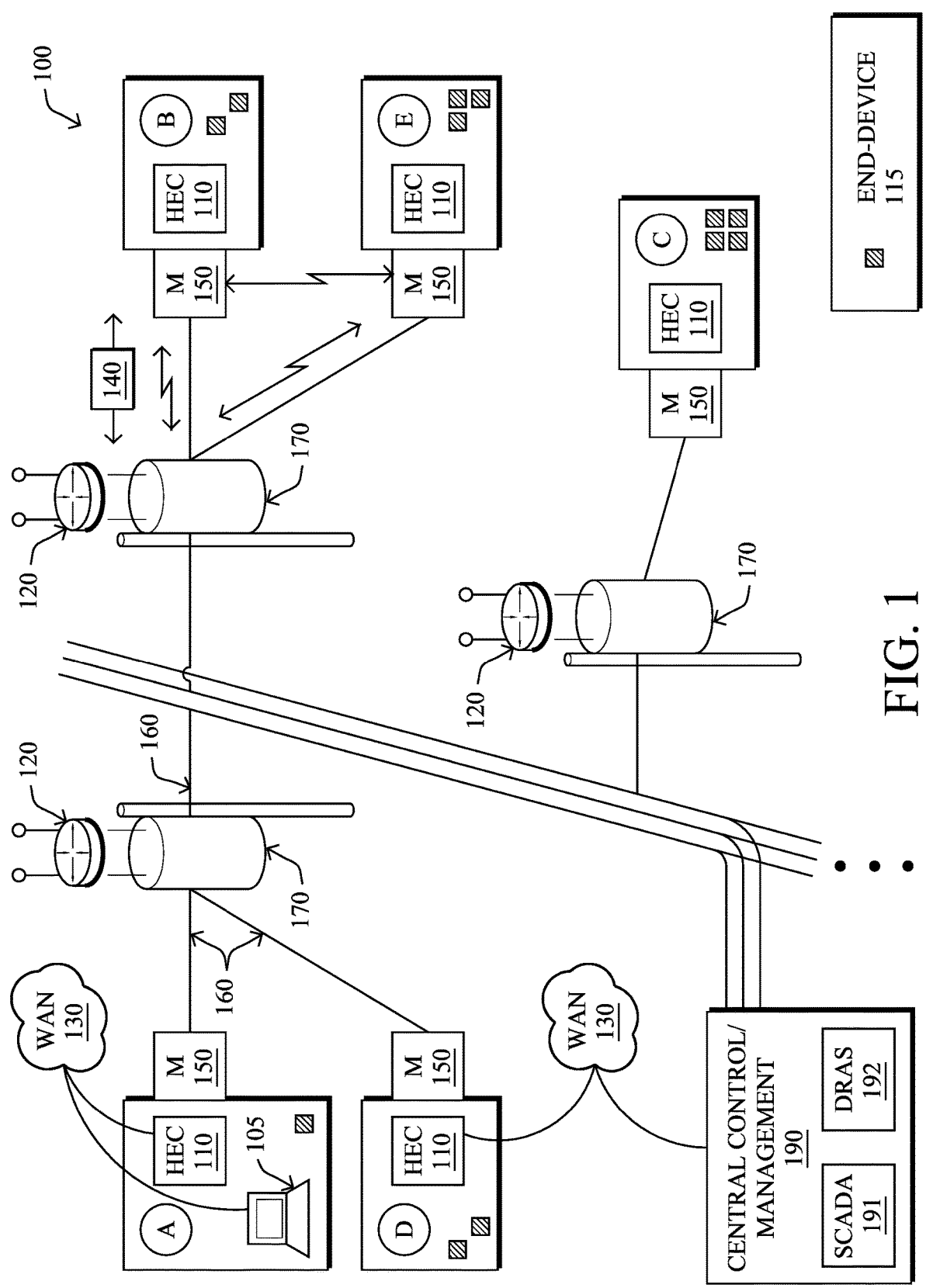
FIG. 1 illustrates an example network of devices in an electric grid shown with various communication and powering configurations.

According to one or more embodiments of the disclosure, a network policy engine obtains a substation configuration description for a particular substation, the substation configuration description indicative of one or more intelligent electronic devices (IEDs) in the particular substation, associated network communication devices of the particular substation, and communication configuration information for the one or more IEDs and associated network communication devices. The network policy engine may then create a mapping of the one or more IEDs and the associated network communication devices based on the substation configuration description, the mapping associating each of the one or more IEDs to a corresponding network port of the associated network communication devices. As such, the network policy engine may then further create network control parameters based on the substation configuration description, the network control parameters comprising one or more defined communication flows for the one or more IEDs and associated security group tags (SGTs) for the defined communication flows. The techniques herein may then cause the SGTs to be imposed at mapped network ports of the network communication devices for the one or more IEDs according to security group access (SGA)-based network control to thereby establish secure network communication for the one or more IEDs within the particular substation.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others.

Smart object networks, in particular, are a specific type of network having spatially distributed autonomous devices such as sensors, actuators, etc. For example, sensor/actuator networks, such as for "Smart Grid" and "Smart Cities" (e.g., for Advanced Metering Infrastructure or "AMI" applications, as well as grid control, generally), may cooperatively monitor and/or control physical or environmental conditions at different locations. For example, sensor networks may be used to monitor energy/power consumption, resource consumption, etc., while another type of smart object, actuators, may be responsible for turning on/off engine, opening/closing circuits, or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices. Though not specifically discussed, those skilled in the art would recognize that this invention covers also objects which by themselves are not "smart" but by being integrated or connected via an adjunct proxy are able to communicate (convey information and receive control commands) with other smart elements of the network.

That is, smart object networks are typically interconnected by a communication network, such as a wireless network, though wired connections are also available, including, e.g., PLC communication. For instance, each smart device (node) in a smart object network may generally be equipped with a radio transceiver or other type of communication port, a microcontroller, and an energy source, such as a battery or a distribution grid power source. Typically, size and cost constraints on sensor nodes result in corresponding constraints on resources such as energy, memory, computational power and bandwidth.

FIG. 1 is a schematic block diagram of an example simplified network 100 of devices illustratively comprising various communicating and non-communicating devices. For example, power-lines 160 may bring electrical grid power from respective transformers 170 into homes/businesses/etc. to power one or more end-devices 115 (such as lights, heaters, air conditioners, refrigerators, computers, industrial machinery, some of which being intelligent electronic devices (IEDs)), generally via a meter 150. In addition, "pole-top" routers 120, such as field area routers (FARs), may communicate data packets 140 (e.g., traffic and/or messages) with other communicating nodes/devices of the network 100. For instance, the links between the devices may be wired links (e.g., for power-line communication "PLC" and/or Ethernet) or may comprise a wireless communication medium. An energy controller (e.g., home energy controller, "HEC") 110 or other energy controller may be present at certain locations, and may be in communication with the meters 150, pole-top routers 120, or else directly to another computer network, e.g., WAN 130, similar to conventional computers 105.

In addition, a centralized control center or management center 190 may be present in the network 100, such as at an electrical grid company's centralized location or substation, and may be in communication over power-lines 160 or via dedicated wireless, radio, IP, or optical network, and through WAN 130. Such a grid control device/system (also referred to as a Distribution Management System, or "DMS"), which may include a supervisory control and data acquisition (SCADA) device 191 or a substation computer, as well as one or more Demand Response automation servers (DRASs) 192 (also referred to as a Demand Response Management System or "DRMS") in certain embodiments, may be located within the network 100, and in communication with the intelligent end devices (IEDs) via illustrative FARs 120. Note that the SCADA 191 may also be configured to monitor and control one or more "grid control devices," such as various electro-mechanical devices (energy storage, capacitor banks, switches, distribution static compensators or "DSTATCOMs," etc.) used to manage operability (e.g., balance, stability, power levels, etc.) within the underlying power grid of network 100. Note that while grid control devices may be co-located with SCADA 191, such devices may actually be located in a separate physical location and connected by a communication link, accordingly.

Notably, the communication components of network 100 may generally comprise a hybrid of communication modalities such as a wireless mesh network, fiber network, PLC network, etc., or even a computer network such as the Internet. That is, the links between the devices may be wired links (e.g., for power-line communication or Ethernet communication), optical fiber network, or may comprise a wireless communication medium. Also, data packets 140 (e.g., traffic and/or messages sent between the devices/nodes) may be exchanged among the communicating nodes/devices of the computer network 100 using predefined network communication protocols such as certain known wired protocols, wireless protocols (e.g., IEEE Std. 802.15.4, WiFi, etc.), PLC protocols, or other shared-media protocols where appropriate. In this context, a protocol consists of a set of rules defining how the nodes interact with each other.

Furthermore, those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

Electric power is generally transmitted from generation plants to end consumers (industries, commercial, residential, etc.) via a transmission and distribution grid consisting of a network of power stations and substations interconnected by transmission circuits/power lines 160. From the transmission grid, power may then be distributed to end consumers via a distribution system. Once at the end consumers, electricity can be used to power any number of devices, such as end-devices 115. As noted above, the Common Information Model (CIM) is an IEC standard which facilitates and simplifies information exchange (such as configuration, topology, status of an electrical network, etc.) amongst various applications. The standard utilizes a UML model to define a common vocabulary and basic ontology for aspects of the electric power industry. The central package within the CIM is the "wires model" which describes the basic components used to transport electricity. The CIM can be used to derive "design artifacts" as needed for the integration of related application software (e.g., XML Schema, RDF Schema).

The standard that defines the core packages of the CIM is IEC 61970-301, with a focus on the needs of electricity transmission, where related applications include energy management systems, SCADA, planning and optimization. The IEC 61970-501 and 61970-452 standards define an XML format for network model exchanges using RDF. The IEC 61968 series of standards extend the CIM to meet the needs of electrical distribution, where related applications include distribution management systems, outage management systems, planning, metering, work management, geographic information systems, asset management, customer information systems and enterprise resource planning. Inside substations, a more detailed model called IEC 61850 is adapted. This model (standard) is used for grid visualization, planning, operations and simulations.

Similarly, Substation Configuration Description Language (SCL) is the language and representation format specified by IEC 61850 for the configuration of electrical substation devices. This includes representation of modeled data and communication services specified by IEC 61850-7-X standard documents. The complete SCL representation and its details are specified in the IEC 61850-6 standard document. It includes data representation for substation device entities; its associated functions are represented as logical nodes, communication systems and capabilities. The complete representation of data as SCL enhances the ability of the different devices of a substation to exchange SCL files and to have complete interoperability.

Utility System vendors have developed various CIM visualization tools and integrated them with their own applications. For example, the following vendors have created CIM based tools (in brackets): Areva T&D (e-Terras), Siemens T&D (PTI), ABB (Spider), CESI (SPIRA), DIgSILENT (PowerFactory), SISCO (UIB), and PowerInfo (CIM-Spy). However, because CIM and SCL provide only limited communication architecture support, and since the above-mentioned utility system companies are not IP networking centric, existing tools are primarily for visualization, and do not support any IP network configuration or provisioning.

The Cisco Substation Configuration Tool (CSCT), developed by Cisco Systems, Inc. of San Jose, Calif., provides for XML viewing through reading the substation configuration descriptor file and displays the topology of the electric grid. Additionally, the tool integrates and displays the topology of the IP network connectivity over which the applications and electric IEDs communicate.

Securing Substation Communications

As mentioned above, modern electrical substations are based on technical specifications such as IEC 61850 for substation automation and IEC 61080 for SCADA systems. IEC 61850-6 defines the Substation Configuration Language (SCL) that specifies communication patterns within a substation.

While SCL has resulted in a well-understood data model and systematic approach to defining substation communication patterns, the application of SCL has mostly focused on programming the IED (Intelligent Electronic Device) communications and other substation devices. In addition, deployment of IED-to-IED communication requires extensive virtual local area network (VLAN) configurations, which is prone to configuration error, is difficult to troubleshoot, and is not easily adaptable to change.

The techniques herein, on the other hand, allow the underlying network to leverage SCL to both configure network infrastructure devices as well as secure the attached substation devices for secure network communications based on security group access (SGA) protocols, such as the TrustSec protocol defined by Cisco Systems, Inc. of San Jose, Calif. Said differently, security is an important requirement and success criteria for (electrical) substation automation systems, and the techniques herein define a flexible, scalable, and robust mechanism to protect the communication based on domain specific configuration files, thus securing substation communications using security groups based on substation configurations Specifically, according to one or more embodiments of the disclosure as described in detail below, a network policy engine obtains a substation configuration description for a substation, indicative of intelligent electronic devices (IEDs) in the particular substation, associated network communication devices of the particular substation, and related communication configuration information for the one or more IEDs and associated network communication devices. The network policy engine then creates a mapping of the IEDs and the associated network communication devices based on the substation configuration description, associating each of the IEDs to a corresponding network port of the associated network communication devices. As such, the network policy engine may then further create network control parameters based on the substation configuration description, which comprise defined communication flows for the IEDs and associated security group tags (SGTs) for the defined communication flows. The techniques herein may then cause the SGTs to be imposed at mapped network ports of the network communication devices for the IEDs according to security group access (SGA)-based network control to thereby establish secure network communication for the IEDs within the particular substation.

Operationally, much of the communication within a substation, and by extension the Distribution Network, follows well-understood, repeated communication patterns and are often point-to-point (P2P) in nature. One example is GOOSE messaging for protection of circuits. Another example is IEC 61850 Sampled Values (SV). SCL files describe the communication behavior and is used by IEDs for automatic configuration; however, the underlying network configuration is disconnected from the substation communication logic. That is, the underlying network is still typically deployed using a complex and manual implementation of static P2P VLANs between IEDs. In typical substation environments, this has led to extensive layer-2 (L2) VLAN deployments with numerous IED to IED VLANs deployed, making it hard to manage and troubleshoot.

The techniques herein, therefore, propose a much more flexible, secure, and reliable approach, introducing an SGA (e.g., TrustSec) structure between associated IED. Through SGA operation it is possible to centrally control policy by assigning unique SGTs between appropriate groups of communicating IEDs, resulting in a more secure and simpler underlying network infrastructure.

To accomplish this, the present disclosure proposes a novel integration of SGA with the SCL file system. The SCL files are typically accessible on the network by internal devices (e.g., IEDs) and are used to configure the IEDs and other substation hosts. Today, SCL files are often statically defined. A more robust and simpler integration method with SGA operation includes several steps, described below.

Notably, Security Group Access (SGA) operation, in particular, offers several benefits, such as:

Granting network resource access based on identity and associated policy;

Enhancing security and control as traffic flows are more easily segmented.

Reducing the cost and complexity associated with large firewall policies and access-list rules;

Providing a mechanism for consistent and dynamic policy propagation across different platforms; and Enabling centralized policy management and auditing per identity.

SGA is based on the concept of assigning a device (or user, application, etc.) a Security Group Tag (SGT), which is illustratively a 16-bit value inserted into a packet or frame. Assignment of the SGT is known as "classification", and when a device is authenticated (e.g., using 802.1X, MAC Authentication Bypass (MAB) or Web Authentication (WebAuth)), the SGT is assigned as part of the authorization policy on an authentication, authorization, and accounting (AAA) server, such as a network policy engine (described below).

Additionally, network resources such as infrastructure devices (routers, switches, firewalls, wireless LAN controllers (WLCs), and services are also assigned SGTs. Tags may also be manually defined at the port level or statically mapped to IP addresses, subnets, or VLANs on individual network devices.

SGA relies on the propagation of SGT information to devices that become policy enforcement points. Propagation of the SGT may be done inline by special hardware ASICs that tag each traffic flow sourced from a user with the assigned SGT. This embedded value is carried with the flow and examined by an enforcement point.

Figure 2:
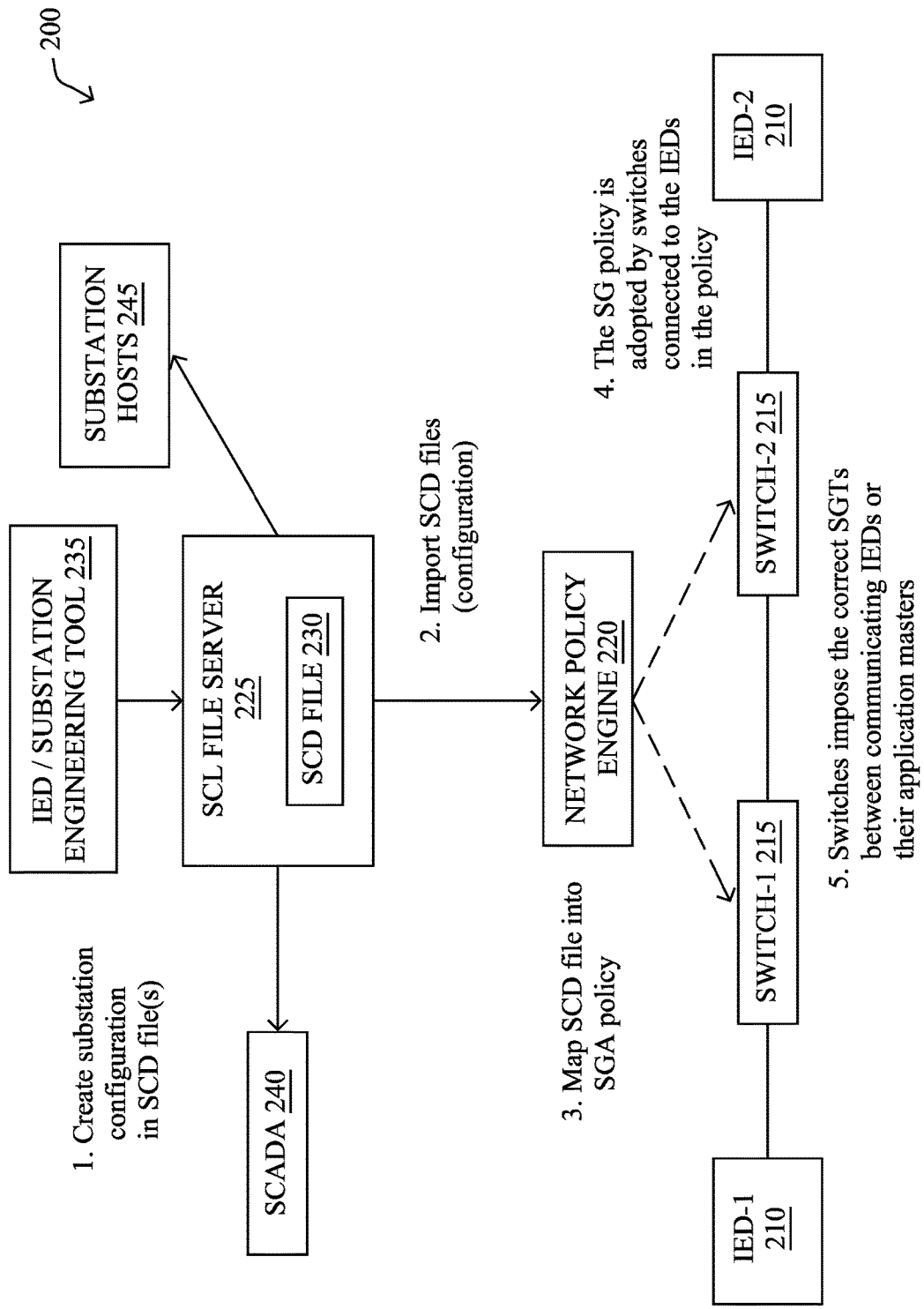
FIG. 2 illustrates an example simplified computer network for a substation.

As an example environment according to the present disclosure, general reference is first made to FIG. 2, which illustrates an example substation network 200, comprising one or more IEDs 210 (e.g., IED-1 and IED-2) interconnected to the network via network devices 215 (e.g., switch-1 and switch-2), such as switches, routers, firewalls, or other types of access points (wired or wireless), depending upon configuration. A network policy engine 220, such as an identity services engine (ISE), such as that available by Cisco Systems, Inc. of San Jose, Calif., may be in communication with each of the network devices 215, and may be located within the substation as shown, or else may be located remotely, such as across a backhaul link, WAN, etc., as may be appreciated by those skilled in the art.

An SCL file server 225 (also optionally within or remote from the substation 200) may obtain and communicate substation configuration descriptions (SCD) 230 (e.g., a type of SCL file). For instance, an IED/substation engineering tool 235 (e.g., an IEC 61850 engineering tool, as will be understood in the art) may be used to initially configure and write SCD files 230, which may be shared with SCADA servers 240, substation hosts 245, or, as described herein, the network policy engine 220.

Figure 3:
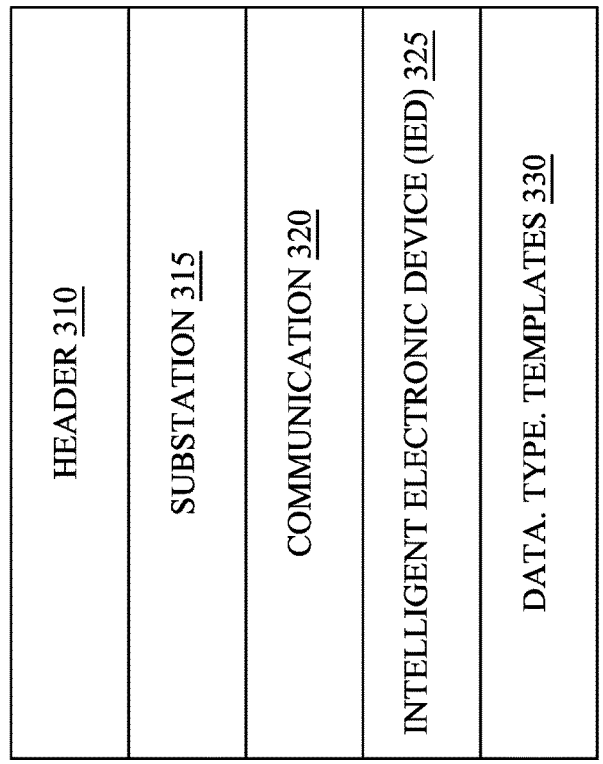
FIG. 3 illustrates an example simplified substation configuration description (SCD) file.

The structure an SCD file may be any suitable structure, though in one embodiment is well-defined and standardized based on the SCL syntax. For example, as shown in FIG. 3, a standard SCL file 300 contains the following parts:

Header 310—identifies version and other basic details of an SCL configuration file 300.

Substation 315—describes different entities of a substation including various devices, interconnections, and other functionalities (e.g., power transformers, voltage levels, bays, general equipment, conducting equipment such as breakers, etc.).

Communication 320—describes different communication points (access points) for accessing the different IEDs of the complete system (e.g., describing different sub networks and access points).

IED 325—describes the complete configuration of an Intelligent Electronic Device (IED). This field contains different access points of the specific IED, the logical devices, and logical nodes, report control blocks, etc. coming under the IED. It also describes what data an IED publishes as reports and as Generic Substation Events (GSE; divided into GOOSE and GSSE) and what GOOSE/GSSE data from other IEDs an IED is configured to receive.

DataTypeTemplates 330—defines different logical devices, logical nodes, data, and other details separated into different instances. (The complete data modeling according to IEC 61850-7-3 & 7-4 are represented in this part of an SCL file. Also, this field may be subdivided into LNodeType, DOType, DAType, and EnumType.)

Notably, other file formats or even protocols may be used aside from the illustrative SCL syntax, for substation configurations or other environments. For instance, manufacturer usage description (MUD) files or IED Capability Description (ICD) files (also based on SCL) may each be used to describe device capabilities according to various known protocols. Though the SCD file is designed to define and describe device capabilities comprehensively, other protocols for other types of networks (e.g., for IoT devices, smart object networks, industrial control networks, etc.) may use such files in a similar manner as the techniques herein.

According to the techniques herein for securing substation communications using security groups based on substation configurations, reference is again made generally to FIG. 2, where the Substation Configuration Description (SCD) file 230 is created ("1.") and contains the complete substation detail, including the IEDs, communication configuration of each IED, as well as data types, as described above. Then, the network policy engine 220 (e.g., ISE) establishes ("2.") a secure connection is made to the SCL file server 225 (e.g., an application programming interface (API) connection or other access communication, such as the Platform Exchange Grid (PxGrid) from Cisco Systems, Inc., of San Jose, Calif.). This secure connection may be used by the network policy engine to read and import the SCD file 230. The imported SCD file 230 (e.g., an XML-based SCL file) may then be parsed by the network policy engine to identify and retrieve each substation identity, along with its communication structure. Substation devices are then added to ISE as managed objects, including any available information about each device.

Based on the parsed SCD file, the network policy engine creates ("3.") an internal mapping of the substation devices, access points, and networks, and associates these elements to physical network ports. This map also includes the media access control (MAC) addresses of the attached devices, which are used for identification of the physical devices. The communication structure of the SCL file may be used to create access control lists (ACLs), but more particularly according to the techniques herein, to also create communication flows and their associated security group tags (SGTs) for security group access (SGA) policy implementation.

Based on the communication mapping that has been generated by the network policy engine, SGTs are now adopted ("4.") at network access ports for each substation device (e.g., switches) 215, such that the SGTs are now imposed ("5.") to provide secure communication between IEDs (or their application masters) based on the central SGA policy (e.g., TrustSec policy).

Notably, as new elements are added or removed within the substation, the network policy engine 220 may retrieve the new associated SCD files (identified by newer timestamps), and may regenerates a new communication map, thus making updates transparent for the network communication, and thus dynamically generating the network configuration required by changes to the upper layer system.

According to the techniques herein, therefore, instead of using exhaustive per-port VLAN configuration (or worse, VLANs spanning across multiple network elements), SGA-based SGTs are now used for secure communication between substation devices in a dynamic and manageable way.

Figure 4:
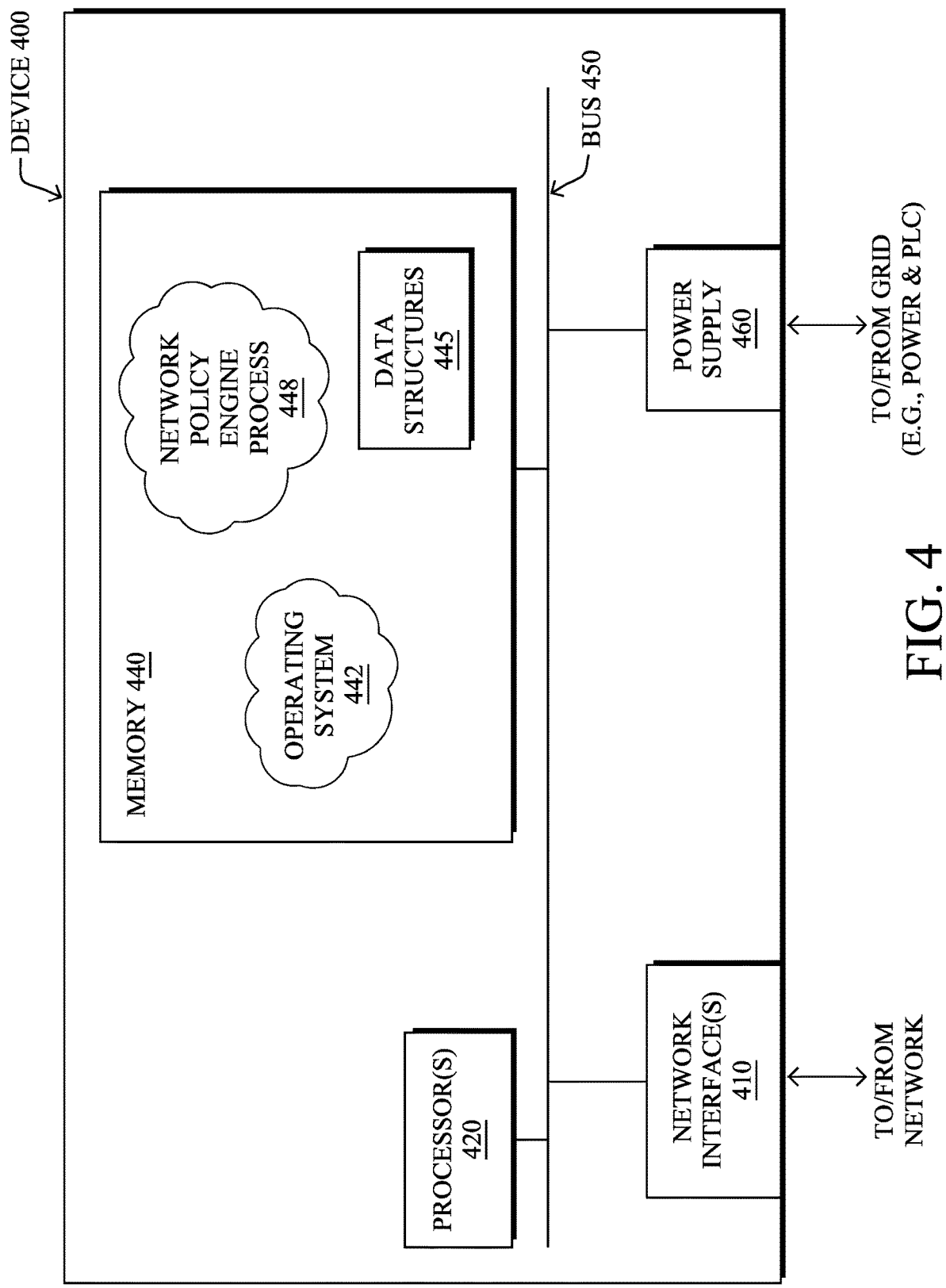
FIG. 4 illustrates an example simplified computer device.

FIG. 4 is a simplified schematic block diagram of an example device 400 that may be used with one or more embodiments described herein, e.g., as network policy engine 220 (e.g., ISE) other suitable device. The device 400 may comprise a network interface 410, a processor 420, and a memory 440 interconnected by a system bus 450. Notably, the device may also be powered by a power supply 460 attached to the power grid (power-line 160 above).

The network interface 410 contains the mechanical, electrical, and signaling circuitry for communicating data over physical and/or wireless links coupled to the network 100.

The network interface may be configured to transmit and/or receive data using a variety of different communication protocols, including various wired or wireless protocols, powerline communication (PLC) protocols, broadband over power lines (BPL), etc.

The memory 440 comprises a plurality of storage locations that are addressable by the processor 420 for storing software programs and data structures associated with the embodiments described herein. The processor 420 may comprise necessary elements or logic adapted to execute the software programs and manipulate the data structures 445, such as SCD files 300, described herein. An operating system 442, portions of which are typically resident in memory 440 and executed by the processor, functionally organizes the device by, among other things, invoking operations in support of software processes and/or services executing on the device. These software processes and/or services may comprise an illustrative network policy engine process 448, for use as described herein, as well as other processes not shown for clarity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network policy engine process 448 may contain computer executable instructions executed by the processor 420 to perform functions relating to the novel techniques described herein. For example, the techniques herein may be treated as extensions to conventional SGA and/or SCL operations, and as such, may be processed by similar components understood in the art that execute those protocols, accordingly. Also, while the techniques herein generally describe the process 448 being on a standalone computer/device attached to the network 200, the process may be distributed across a plurality of devices (e.g., obtaining the SCD file on a first device, sharing the SCD file or SGTs created from the SCD file with a second device, which then creates/shares the SGTs with the network devices, and so on).

Figure 5:
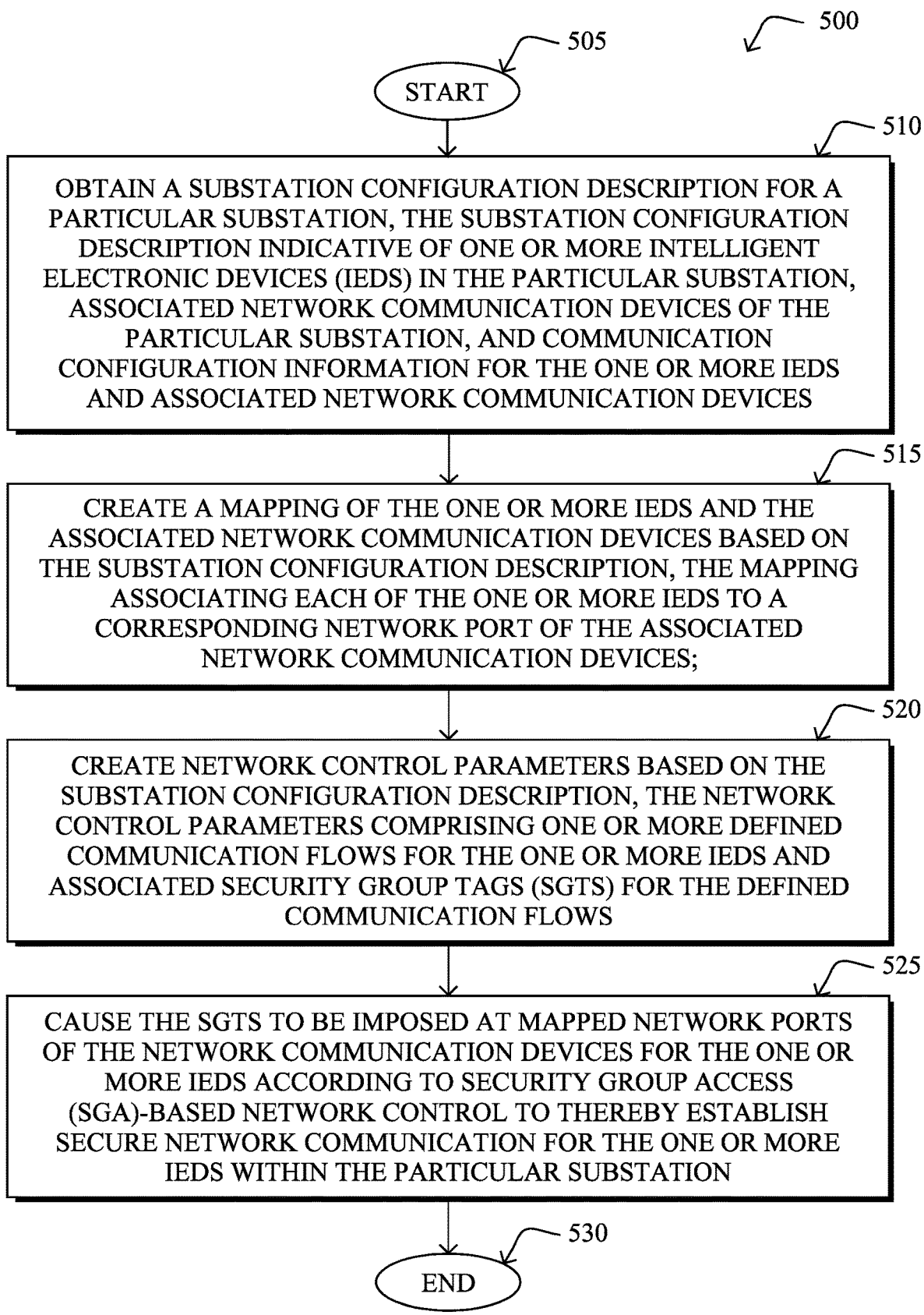
FIG. 5 illustrates an example simplified procedure for securing substation communications using security groups based on substation configurations.

FIG. 5 illustrates an example simplified procedure for securing substation communications using security groups based on substation configurations in accordance with one or more embodiments described herein. For example, a non-generic, specifically configured device (e.g., device 400) may perform procedure 500 by executing stored instructions (e.g., process 448). The procedure 500 may start at step 505, and continues to step 510, where, as described in greater detail above, a network policy engine 220 obtains a substation configuration description 230 (e.g., an SCL file, MUD file, etc.) for a particular substation 200, the substation configuration description indicative of one or more intelligent electronic devices (IEDs) 210 in the particular substation, associated network communication devices 215 of the particular substation, and communication configuration information for the one or more IEDs and associated network communication devices. For instance, as described above, the SCD file may be configured as an extensible markup language (XML)-based SCL file, where the network policy engine parses the XML-based file to determine, correspondingly, the particular substation identity, one or more IEDs in the substation, and communication configuration information for each IED of the one or more IEDs. As also noted above, the one or more IEDs may be added into the network policy engine as managed objects.

In step 515, the network policy engine may then create a mapping of the one or more IEDs and the associated network communication devices based on the substation configuration description, the mapping associating each of the one or more IEDs to a corresponding network port of the associated network communication devices. (Note that the one or more IEDs and one or more network communication devices within the mapping may be identified by respective MAC addresses, accordingly.)

In step 520, the network policy engine may then create "network control parameters" based on the substation configuration description, where the network control parameters comprise one or more defined communication flows for the one or more IEDs and associated security group tags (SGTs) for the defined communication flows. (Note that in certain configurations, the network control parameters may further comprise one or more ACLs for distribution to one or more firewall processes within the mapping.)

The network policy engine then causes the SGTs to be imposed at mapped network ports of the network communication devices for the one or more IEDs in step 525 according to SGA-based network control to thereby establish secure network communication for the one or more IEDs within the particular substation, as described above.

The illustrative simplified procedure 500 may then end in step 530, notably with the ability to obtain an updated substation configuration description indicative of one or more IED modifications and to create a new mapping in response to the updated substation configuration description, as mentioned above.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for securing substation communications using security groups based on substation configurations. In particular, the techniques herein use domain specific data to enhance security policies on the network infrastructure (that is, extending IED configuration logic into network infrastructure control), and specifically in a manner that is non-disruptive for the IED and SCL structures (transparency at a higher level between configuration and protection). The techniques herein also create a link between the SCL structure, which reflects the true intent of the substation communication system, and the underlying network infrastructure, which was previously only considered as supporting, but unrelated to, the SCL structure. Given the criticality of security for smart grids (especially in light of recent claims about hacker capabilities and the ability to hijack network ports), the techniques herein offer enhanced security measures based on security tagging which are dynamic and scalable, without relying on manual configuration, VLAN (or VPN) configuration, and traditional ACLs and firewalls (particularly since much of the substation communication happens locally within the station or process bus and is not likely to even see a firewall).

While there have been shown and described illustrative embodiments that provide for securing substation communications using security groups based on substation configurations, it is to be understood that various other adaptations and modifications may be made within the spirit and scope of the embodiments herein. For example, the embodiments have been shown and described herein with relation to electric grid topology. However, the embodiments in their broader sense are not as limited, and may, in fact, be used with other types of physical topologies and corresponding communication networks, such as other utilities (water, gas, etc.), other types of networks (e.g., sensor networks), etc. In addition, while certain protocols and/or languages are shown, such as SCL, XML, SGTs etc., other suitable protocols and/or languages may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    obtaining, at a network policy engine, a substation configuration description for a particular substation, the substation configuration description indicative of one or more intelligent electronic devices (IEDs) in the particular substation, associated network communication devices of the particular substation, and communication configuration information for the one or more IEDs and associated network communication devices;
    creating, by the network policy engine, a mapping of the one or more IEDs and the associated network communication devices based on the substation configuration description, the mapping associating each of the one or more IEDs to a corresponding network port of the associated network communication devices;
    creating, by the network policy engine, network control parameters based on the substation configuration description, the network control parameters comprising one or more defined communication flows for the one or more IEDs and associated security group tags (SGTs) for the defined communication flows; and
    causing, by the network policy engine, the SGTs to be imposed at mapped network ports of the network communication devices for the one or more IEDs according to security group access (SGA)-based network control to thereby establish secure network communication for the one or more IEDs within the particular substation.

2. The method as in claim 1, further comprising:
    obtaining an updated substation configuration description indicative of one or more IED modifications; and
    creating a new mapping in response to the updated substation configuration description.

3. The method as in claim 1, wherein the network policy engine comprises an identity services engine (ISE).

4. The method as in claim 1, wherein the network control parameters further comprise one or more access control lists (ACLs) for distribution to one or more firewall processes within the mapping.

5. The method as in claim 1, further comprising:
    identifying the one or more IEDs and one or more network communication devices within the mapping by respective media access control (MAC) addresses.

6. The method as in claim 1, wherein the network communication devices are selected from a group consisting of: routers; switches; access points; and firewalls.

7. The method as in claim 1, further comprising:
    adding the one or more IEDs into the network policy engine as managed objects.

8. The method as in claim 1, wherein the substation configuration description comprises a substation configuration language (SCL) file.

9. The method as in claim 8, wherein the SCL file is an extensible markup language (XML)-based file, the method further comprising:
    parsing the XML-based file to determine the particular substation identity, one or more IEDs in the substation, and communication configuration information for each IED of the one or more IEDs.

10. The method as in claim 1, wherein the substation configuration description comprises a manufacturer usage description (MUD) file.

11. An apparatus, comprising:
    one or more network interfaces to communicate with a network;
    a processor coupled to the network interfaces and configured to execute one or more processes; and
    a memory configured to store a process executable by the processor, the process when executed configured to:
        obtain a substation configuration description for a particular substation, the substation configuration description indicative of one or more intelligent electronic devices (IEDs) in the particular substation, associated network communication devices of the particular substation, and communication configuration information for the one or more IEDs and associated network communication devices;
        create a mapping of the one or more IEDs and the associated network communication devices based on the substation configuration description, the mapping associating each of the one or more IEDs to a corresponding network port of the associated network communication devices;
        create network control parameters based on the substation configuration description, the network control parameters comprising one or more defined communication flows for the one or more IEDs and associated security group tags (SGTs) for the defined communication flows; and
        cause the SGTs to be imposed at mapped network ports of the network communication devices for the one or more IEDs according to security group access (SGA)-based network control to thereby establish secure network communication for the one or more IEDs within the particular substation.

12. The apparatus as in claim 11, wherein the process is further configured to:
    obtain an updated substation configuration description indicative of one or more IED modifications; and
    create a new mapping in response to the updated substation configuration description.

13. The apparatus as in claim 11, wherein the network control parameters further comprise one or more access control lists (ACLs) for distribution to one or more firewall processes within the mapping.

14. The apparatus as in claim 11, wherein the network communication devices are selected from a group consisting of: routers; switches; access points; and firewalls.

15. The apparatus as in claim 11, wherein the substation configuration description comprises a substation configuration language (SCL) file.

16. A tangible, non-transitory, computer-readable medium storing program instructions that cause a computer to execute a process, comprising:
- obtaining a substation configuration description for a particular substation, the substation configuration description indicative of one or more intelligent electronic devices (IEDs) in the particular substation, associated network communication devices of the particular substation, and communication configuration information for the one or more IEDs and associated network communication devices;
- creating a mapping of the one or more IEDs and the associated network communication devices based on the substation configuration description, the mapping associating each of the one or more IEDs to a corresponding network port of the associated network communication devices;
- creating network control parameters based on the substation configuration description, the network control parameters comprising one or more defined communication flows for the one or more IEDs and associated security group tags (SGTs) for the defined communication flows; and
- causing the SGTs to be imposed at mapped network ports of the network communication devices for the one or more IEDs according to security group access (SGA)-based network control to thereby establish secure network communication for the one or more IEDs within the particular substation.

17. The computer-readable medium as in claim 16, wherein the process further comprises:
- obtaining an updated substation configuration description indicative of one or more IED modifications; and
- creating a new mapping in response to the updated substation configuration description.

18. The computer-readable medium as in claim 16, wherein the network control parameters further comprise one or more access control lists (ACLs) for distribution to one or more firewall processes within the mapping.

19. The computer-readable medium as in claim 16, wherein the network communication devices are selected from a group consisting of: routers; switches; access points; and firewalls.

20. The computer-readable medium as in claim 16, wherein the substation configuration description comprises a substation configuration language (SCL) file.

\* \* \* \* \*